US007818970B2

(12) United States Patent
Price et al.

(10) Patent No.: US 7,818,970 B2
(45) Date of Patent: Oct. 26, 2010

(54) CONTROLLING A GAS TURBINE ENGINE WITH A TRANSIENT LOAD

(75) Inventors: Brian John Price, Baie d'Urfe (CA); Louis Demers, Lachine (CA)

(73) Assignee: Rolls-Royce Power Engineering plc, Derby (GB)

( * ) Notice: Subject to any disclaimer, the term of this patent is extended or adjusted under 35 U.S.C. 154(b) by 1084 days.

(21) Appl. No.: 11/516,882

(22) Filed: Sep. 7, 2006

(65) Prior Publication Data

US 2010/0000222 A1 Jan. 7, 2010

Related U.S. Application Data

(60) Provisional application No. 60/716,853, filed on Sep. 12, 2005.

(51) Int. Cl.
*F02C 6/08* (2006.01)
(52) U.S. Cl. .................. 60/782; 60/39.281; 60/795
(58) Field of Classification Search ........... 60/782, 60/785, 795, 39.281
See application file for complete search history.

(56) References Cited

U.S. PATENT DOCUMENTS

| 3,316,713 A | * | 5/1967 | Urban .................. 60/39.281 |
| 3,348,560 A | * | 10/1967 | Stearns ..................... 137/38 |
| 3,727,400 A | * | 4/1973 | Harrison et al. ............. 60/795 |
| 3,867,717 A | * | 2/1975 | Moehring et al. .......... 340/626 |
| 3,978,658 A | | 9/1976 | Forbes et al. |
| 4,267,693 A | | 5/1981 | Stearns |
| 4,326,376 A | | 4/1982 | Stearns et al. |
| 5,361,579 A | | 11/1994 | Bachelder |
| 5,363,641 A | * | 11/1994 | Dixon et al. ................ 60/778 |
| 5,375,412 A | * | 12/1994 | Khalid et al. ............... 60/795 |
| 5,515,673 A | | 5/1996 | Leclerco et al. |
| 5,743,079 A | | 4/1998 | Walsh et al. |
| 6,282,882 B1 | | 9/2001 | Dudd, Jr. et al. |
| 6,345,602 B1 | * | 2/2002 | Maddock et al. ............ 123/352 |
| 6,779,332 B2 | * | 8/2004 | Horii et al. ................. 60/39.3 |
| 2002/0033014 A1 | | 3/2002 | Endo et al. |
| 2003/0079476 A1 | | 5/2003 | Jay et al. |
| 2003/0140614 A1 | | 7/2003 | Nearhoof, Sr. et al. |
| 2003/0144787 A1 | | 7/2003 | Davis, Jr. et al. |
| 2004/0024516 A1 | | 2/2004 | Hook et al. |
| 2004/0107701 A1 | | 6/2004 | Miyake et al. |
| 2004/0159104 A1 | | 8/2004 | Busch |
| 2004/0200206 A1 | | 10/2004 | McKelvey et al. |
| 2004/0206091 A1 | | 10/2004 | Yee et al. |
| 2005/0072159 A1 | | 4/2005 | Pashley et al. |

* cited by examiner

*Primary Examiner*—William H Rodríguez
(74) *Attorney, Agent, or Firm*—Krieg DeVault LLP

(57) ABSTRACT

A technique is provided for operating a gas turbine engine that has a combustor with a primary stage and one or more other stages and a first compressor providing an air flow to the combustor. This technique includes driving a variable load device with the rotating shaft of the gas turbine engine and sensing pressure of the air flow and an engine speed. In response to a decrease in loading of the engine by the variable load device: selectively bleeding the air flow as a function of the engine speed and regulating temperature in the primary stage of the combustor as a function of a ratio between fuel flow provided to primary stage and the pressure to prevent engine flame out. In one form, the combustor is arranged as a dry load emissions type and the variable load device includes an electric power generator.

34 Claims, 5 Drawing Sheets

CONTROLLING A GAS TURBINE ENGINE WITH A TRANSIENT LOAD

CROSS-REFERENCE TO RELATED APPLICATIONS

The present application claims the benefit of U.S. Provisional Patent Application 60/716,853 filed on 12 Sep. 2005, which is hereby incorporated by reference in its entirety.

BACKGROUND

The present invention relates to gas turbine engine operation, and more particularly, but not exclusively relates to control of a gas turbine engine with a transient load.

For gas turbine engines primarily dedicated to the supply of mechanical power through a rotating shaft, there are some systems that impose a widely varying load on the engine. For example, electric power generators that are driven by a gas turbine engine often present an engine load that varies with electrical load on the generator. As loading rapidly changes for such systems, there is typically a desire to maintain engine speed within a specified range to correspondingly provide electric power from the generator that stays within an acceptable Alternating Current (AC) frequency band. In addition to electrical power generation, other systems driven by a rotating shaft of a gas turbine engine present transient loads that need to be regulated. Such systems include marine vehicles, amphibious vehicles, and pumps powered by one or more gas turbine engines—just to name a few.

For many of these applications, the need to reduce pollutants has resulted in the development of more sophisticated gas turbine engine combustion techniques. Typically, these techniques are sensitive to transient loading and/or part-load conditions, which lead to new challenges concerning engine operation and control—especially in the area of transient load management. Thus, there is a demand for further contributions in this area of technology.

SUMMARY

One embodiment of the present invention includes a unique technique to control operation of a gas turbine engine. Other embodiments include unique apparatus, devices, systems, and methods to control a gas turbine engine with a transient load. Further embodiments, forms, objects, features, advantages, aspects, and benefits of the present application shall become apparent from the detailed description and drawings included herein.

DETAILED DESCRIPTION OF SELECTED EMBODIMENTS

Figure 1:
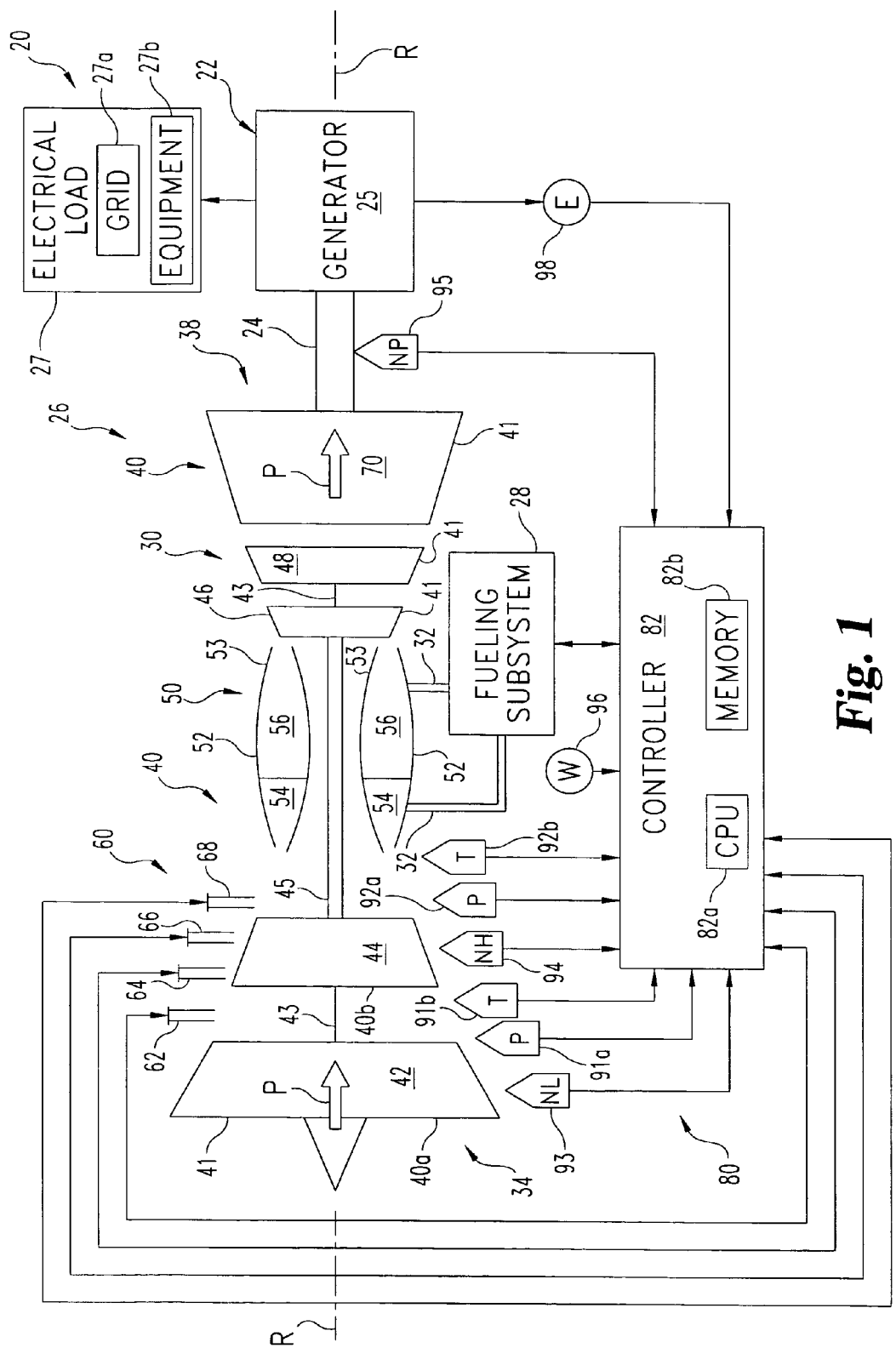
FIG. 1 is a partial, diagrammatic view of a gas turbine engine system for generating electric power.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present invention is a gas turbine engine with a rotatable shaft structured to deliver mechanical power. The engine includes a multistage combustor structure for Dry Low Emissions (DLE) operation. Engine fueling is scheduled to maintain a desired combustion zone temperature in a primary stage of the combustor structure to reduce the likelihood of flameout and prevent reaching excessive combustor temperatures likely to cause damage. In response to an overspeed condition, compressor bleed is dynamically varied in correspondence to overspeed magnitude. Alternatively or additionally, compressor bleed can be selectively utilized to reduce power output of the engine in response to a partial load condition while still providing fuel flow needed to maintain the desired combustion zone temperature. The engine may be utilized to power any of a number of devices such as land vehicles, marine vehicles, pumps, and/or electric power generators, just to name a few possibilities.

FIG. 1 illustrates a gas turbine engine system 20 of another embodiment of the present application. System 20 includes a variable load device 22 that receives mechanical power from a rotating shaft 24. For the depicted embodiment, device 22 is in the form of an electric power generator 25. System 20 further includes gas turbine engine equipment 26. Shaft 24 mechanically couples the device 22 to the gas turbine engine equipment 26, and provides rotational power to the device 22. Shaft 24 can be directly mechanically connected to the device 22 or can be coupled through one or more gear boxes, clutches, torque converters, transmissions, or a different mechanical linkage as would occur to those skilled in the art. The specific implementation of the shaft coupling typically varies with the nature of the device 22.

Generator 25 provides Alternating Current (AC) electrical power to variable electrical load 27. Load 27 includes an electric power supply grid 27a and local equipment 27b both powered by generator 25. Load 27 includes switching to selectively connect and disconnect generator 25 from grid 27a and to selectively connect and disconnect generator 25 from equipment 27b. For this arrangement, load 27 can present rapid step load changes to generator 25 that include a high load of both grid 27a and equipment 27b to a low or medium load of just equipment 27b, as well as no-load to high load, and high load to no-load step changes. Also, the power requirement of grid 27a and/or equipment 27b is subject to change during operation, providing further variability. Accordingly, dynamic changes in loading result in a range of power levels, including a relatively low level. Nonetheless, in other embodiments, load 27 may be dedicated to supplying power to an electric power grid only, may be dedicated to standalone power generation for local equipment only, or a different arrangement.

The equipment 26 includes an engine fueling subsystem 28 and a gas turbine engine 30. The fueling subsystem 28 includes multiple, independently controlled fuel lines 32. Engine 30 includes an air inlet 34 and a discharge outlet 38. Engine 30 defines a working fluid flow path P as symbolized by like-labeled arrows in FIG. 1. Working fluid flow path P flows from the inlet 34 of engine 30 to a working fluid discharge outlet 38 (also schematically depicted).

The engine 30 includes turbomachinery 40 that comprises a number of rotors 41 connected to a respective shaft to turn about rotational axis R. More specifically, engine 30 includes a dual spool arrangement with a low pressure spool 40a and a high pressure spool 40b. The spool 40a includes a low pressure compressor 42 connected to turn with a shaft 43 about axis R. A turbine 48 is also connected to the shaft 43 to turn about axis R with the compressor 42. The spool 40b includes high pressure compressor 44 connected to turn with a shaft 45 about axis R. A turbine 46 is also connected to the shaft 45 to turn about axis R in concert with the compressor 44. The shaft 43 extends from the compressor 42 to the turbine 48 along a passageway that coaxially extends through shaft 45 so that the spool 40a and the spool 40b can rotate about axis R independent of one another.

Engine 30 further includes combustion subsystem 50. Combustion system 50 includes a number of multistage combustors 52, only two of which are schematically shown in FIG. 1. Each of combustors 52 includes a combustor structure 53 defining a primary stage 54 and one or more other stages 56. In one form, these one or more other stages 56 include a secondary stage and a tertiary stage as described in U.S. Pat. No. 5,743,079 to Walsh et al., which is hereby incorporated by reference. In other forms, more or fewer stages and/or an otherwise differently arranged combustor structure may be utilized. Combustion system 50 is of a DLE type; however, in other embodiments it may vary as desired for the corresponding application. For further background on DLE-type combustion, see U.S. Patent Application No. 2004/0024516 to Hook et al., which is hereby incorporated by reference.

Furthermore, combustors 50 include a separate combustion 'diffusion' mode that is used to start and accelerate the engine to a power level sufficient to operate in DLE mode. During a rapid deceleration, there may be insufficient time to transfer back to the diffusion mode and so operation at idle in the DLE mode results. For such systems, the greater the amount of bleed, the higher the combustion temperature for a given idle setting. Correspondingly, the bleed needs to be sufficient to raise the combustor temperature above the weak extinction level at idle. In other embodiments multiple modes are not provided and/or one or more different modes are alternatively utilized.

Primary stage 54 of combustor structure 53 receives fuel from a corresponding one of the fuel lines 32 that is independently controllable. For each structure 53, the other stages 56 each include a corresponding one of the lines 32 that are also each independently controllable. Only two lines 32 are shown in FIG. 1 to preserve clarity. Typically, control of each line 32 is provided by at least one actuator-controlled fuel valve (not shown) that regulates fuel flow to the respective combustor stage.

Engine 30 also includes an air bleed subsystem 60 comprising a number of bleed devices 62, 64, 66, 68 each in the form of one or more valves to divert air from path P upstream of combustors 52. In one form, bleed devices 62, 64, 66, and 68 correspond to a low pressure compressor exit bleed, high pressure compressor stage 3 interstage bleed, high pressure compressor stage 6 interstage bleed, and high pressure compressor discharge exit bleed, respectively. However, it should be understood that other bleed device configurations involving more, fewer, and/or different locations or stages could be utilized. Engine 30 may include other controlled devices to provide Compressor Variable Geometry (CVG) or the like as would occur to those skilled in the art.

The engine 30 includes a free power turbine 70 that is downstream of the turbine 48 along the working fluid flow path P. The free power turbine 70 is fixed to the shaft 24. The free power turbine 70 is driven by working fluid impinging on it along path P before it exits through the outlet 38, which in response turns the shaft 24 and correspondingly provides rotational power to the device 22. In other applications, a different variable load device is driven by engine 30, such as a pump, construction or earth moving equipment, a land or rail vehicle, an amphibious vehicle, a marine vehicle, or the like—just to name some representative examples. In still other embodiments, device 22 may differ as would occur to those skilled in the art.

Working fluid sufficient to drive the free power turbine 70 is provided through standard gas turbine engine operation. Generally, air is drawn through the inlet 34, which is then compressed by the low pressure compressor 42. The pressurized discharge of the low pressure compressor 42 is further pressurized by the high pressure compressor 44, which then discharges the working fluid at high pressure to the combustors 52. Fuel is introduced into the working fluid discharged by the high pressure compressor 44, and ignited within the combustors 52. The expanding gases resulting from this combustion are discharged by the combustors 52 at the inlet to the turbine 46. In response, the turbine 46 is rotated and correspondingly the shaft 45 rotates, which turns the high pressure compressor 44 to provide a persistent stabilized operation of the spool 40b. The working fluid discharged from the turbine 46 flows along path P to the inlet of the turbine 48. The impinging working fluid turns the turbine 48 in a manner like the turbine 46, causing the shaft 43 to rotate and correspondingly turning the low pressure compressor 42. In this manner, the rotation of the compressors 42 and 44 is continued by the operation of the combusted working fluid that drives the respective turbines 48 and 46. As the working fluid is discharged from the turbine 48, the free power turbine 70 is encountered. In response, the free power turbine 70 rotates and correspondingly turns the shaft 24 to provide rotational mechanical power to the device 22, as previously described.

To regulate the operation of the gas turbine engine 30, a control subsystem 80 is provided. Control subsystem 80 includes several input devices (such as sensors) and several output devices (such as actuators) operatively coupled to a controller 82. Controller 82 includes a central processing unit 82a and a memory 82b, and may include other features such as limiters, conditioners, filters, format converters, or the like which are not shown to preserve clarity. An operator input device can also be coupled to the controller 82 to provide corresponding operator input to adjust/direct one or more aspects of engine operation. A display, audible alarm, warning light(s), or the like can also be coupled to the controller 82 that each respond to various output signals from controller 82.

Controller 82 is comprised of one or more components that may be configured as a single unit, or distributed among two or more units. The processing unit 82a and/or the memory 82b may be combined in a common integrated circuit, defined by separate circuitry, or comprised of one or more other component types of a solid state, electromagnetic, optical, or different variety as would occur to those skilled in the art. The controller 82 may include analog circuitry, digital circuitry, and/or a hybrid combination of both of these types. In one form, the controller 82 is of the programmable variety that executes algorithms and processes data in accordance with operating logic that is defined by programming instructions (such as software or firmware). Alternatively or additionally, operating logic for controller 82 is at least partially defined by hardwired logic or other hardware. In one particular form, the controller 82 is configured to operate as a Full Authority Digital Engine Control (FADEC); however, in other embodiments it may be organized/configured in a different manner as would occur to those skilled in the art.

Subsystem 80 also includes a number of sensors to provide input to controller 82. Some of these inputs are illustrated in FIG. 1 as pressure sensors, as generically denoted by a "P." or temperature sensors, as generically noted by a "T." More specifically, a pressure sensor 91a is coupled to the controller 82 to provide a pressure signal P20 that corresponds to inlet pressure for compressor 42, and a temperature sensor 91b is coupled to the controller 82 to provide a temperature signal T20 that corresponds to inlet temperature for compressor 42. Pressure sensor 92a is coupled to the controller 82 to provide a pressure signal P30 that corresponds to high pressure compressor 44 discharge pressure, and a temperature sensor 92b is coupled to the controller 82 to provide a temperature signal T30 that corresponds to temperature at the discharge of high pressure compressor 44. Temperature signal T30 can be used to represent inlet temperature to combustors 52 and/or combustor inlet temperature can be inferred from signal T30. The pressure and temperature readings detected with sensors 91a, 91b, 92a, and 92b can each be of a total type, a static type, or a combination of total and static types.

Several rotation sensors and corresponding signals are also included in subsystem 80. For example, sensor 93 detects rotation of low pressure spool 40a (including compressor 42, shaft 43, and turbine 48) and determines rotational speed from the detected rotation or directly detects rotational speed or another corresponding parameter from which rotational speed is determined. The resulting low pressure spool speed from sensor 93 is indicated as signal NL. Sensor 94 detects rotation of high pressure spool 40b (including compressor 44, shaft 45, and turbine 46) and determines rotational speed from the detected rotation or directly detects rotational speed or another corresponding parameter from which rotational speed is determined. The resulting high pressure spool speed from sensor 94 is indicated as signal NH. Sensor 95 detects rotation of free power turbine 70 and shaft 24 and determines rotational speed from the detected rotation or directly detects rotational speed or another corresponding parameter from which rotational speed is determined. The resulting power shaft speed from sensor 95 is indicated as signal NP, and is alternatively designated power train speed.

Subsystem 80 also includes humidity sensor 96 coupled to controller 82 from which specific humidity of the working fluid air is provided as signal ω. Further, generator feedback device 98 provides one or more detected parameters from generator 25 that are input to controller 82. These parameters include a two-state signal that represents whether a master circuit breaker for electric power output of generator 25 is open (first state) or closed (second state). Other parameters can include generator output voltage, output power electrical current flow, and/or electrical power output frequency. It should be appreciated that an output frequency reading is indicative of rotational speed of shaft 24 under appropriate conditions and could be used in place of or in addition to power shaft speed signal NP in some applications.

It should further be understood that subsystem 28 provides an output corresponding to fuel flow levels of lines 32 to controller 82 and/or the fuel flow can be inferred from information otherwise available to controller 82. Also, the setting of bleed devices, including the degree any bleed valves are open, is provided by feedback to controller 82 and/or can be inferred from information otherwise available to controller 82.

Referring to FIGS. 2-6, a fuel control and a bleed control are schematically described. These controls are implemented with the operating logic of controller 82. Generally, fuel flow, denoted as signal WFPZ, is determined from a schedule dependent on the pressure signal P30 and temperature signal T30 at the discharge from high pressure compressor 44. Minimum and maximum fueling extremes are controlled to prevent or at least reduce flameout caused by underfueling and damage due to excess temperatures caused by overfueling. Beside fuel control, pressurized air upstream of combustors 52 is selectively bled from the working fluid path to address decreased loading of engine 30 and/or low/medium power (partial load) operation of engine 30.

Figure 2:
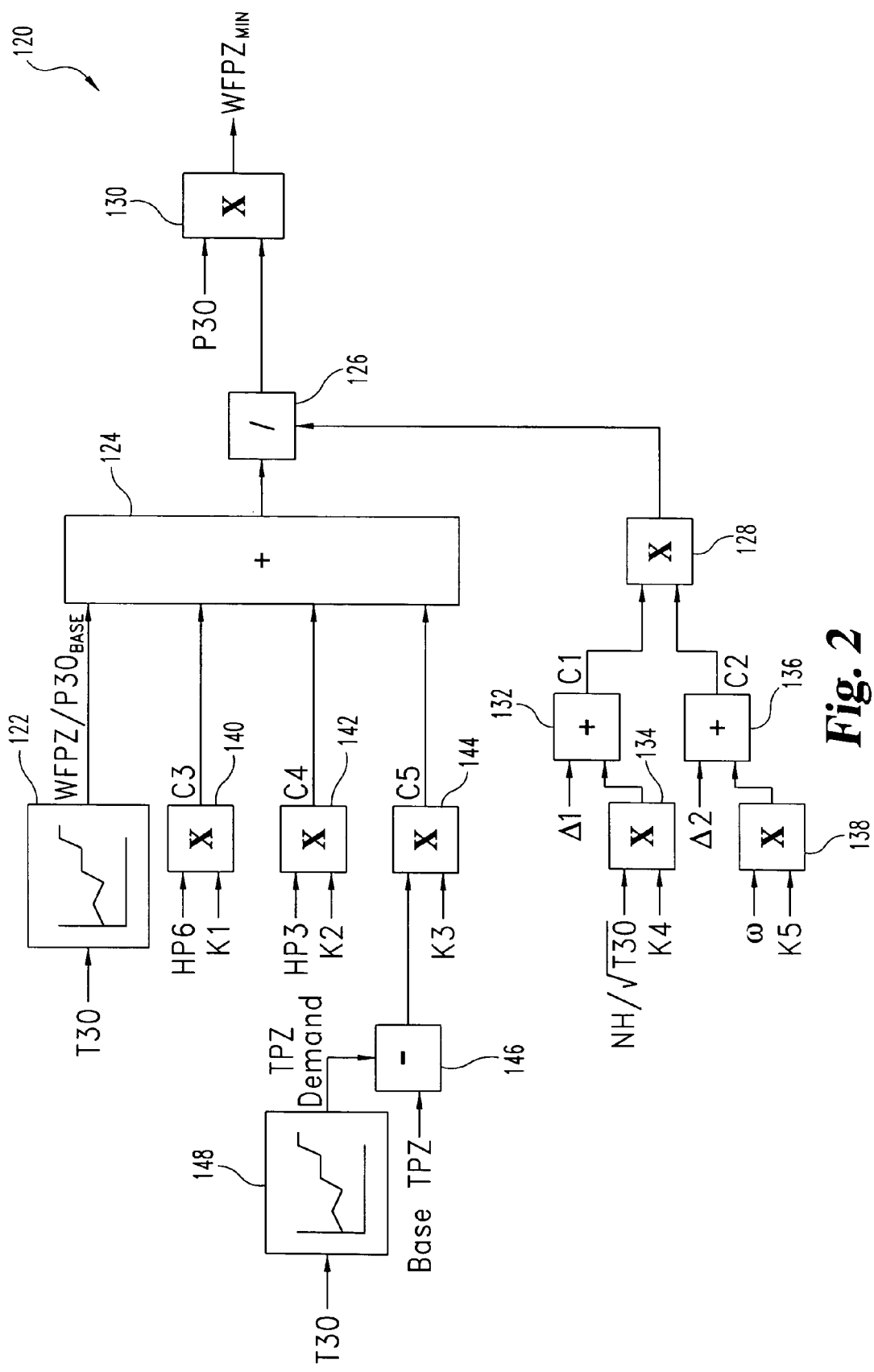
FIG. 2 is diagrammatic view of a fuel control for the system of FIG. 1.

Referring more specifically to FIG. 2, fuel control 120 is schematically depicted, which focuses on maintaining a minimum fuel flow WFPZmin needed to reduce, if not eliminate, flameout due to underfueling of the primary combustion zone of primary stage 54 of each combustor. Maximum fuel flow control is provided by other operating logic of controller 82 (not shown). In operation, a schedule 122 outputs a base level ratio of fuel flow signal WFPZ to pressure signal P30 (WFPZ/P30base) that is selected with temperature signal T30 from sensor 92b. A summation operator 124 adds the ratio WFPZ/P30base to correction factors C3, C4, and C5 to output the sum: WFPZ/P30base+C3+C4+C5.

The output of summation operator 124 is input as the numerator of divider 126. The denominator of divider 126 is provided by multiplier 128. Multiplier 128 provides the product of two inputs, correction factors C1 and C2. The output of divider 126 is the ratio WFPZ/P30min, a corrected fuel demand ratio determined to prevent flameout. The ratio WFPZ/P30 min from divider 126 is converted to the fuel flow demand signal WFPZmin by multiplication with the high pressure compressor discharge signal P30 from sensor 92a by multiplier 130. Control 120 outputs the minimum fuel demand signal WFPZmin. In response to signal WFPZmin, fueling subsystem 28 provides a minimum fuel flow to the primary combustion zone of stage 54 of each combustor 52 that is determined to reduce, if not eliminate, flameout.

Control 120 also includes logic to generate correction factors C1-C5. C1 is output by summation operator 132. Summation operator 132 sums a difference value Δ1 that is dependent on the given engine configuration and the output of multiplier 134. Multiplier 134 provides the product of multiplicands K4 and the ratio of signal NH from sensor 94 and the square root of temperature signal T30 from sensor 92b (NH/$((T30)^{1/2})$). C2 is output by summation operator 136. Summation operator 136 provides the sum of a difference value Δ2 that is dependent on the given engine configuration and the output of multiplier 138. Multiplier 138 provides the product of multiplicands K5 and the humidity signal ω from sensor 96. As previously indicated, correction factors C1 and C2 are multiplied together by multiplier 128 to provide a divisor for divider 126.

Correction factor C3 is provided by multiplier 140. Multiplier 140 provides the product of inputs K1 and signal HP6. Signal HP6 corresponds to the bleed at stage 6 of high pressure compressor 44. Correction factor C4 is provided by multiplier 142. Multiplier 142 provides the product of inputs K2 and signal HP3. Signal HP3 corresponds to the bleed at stage 3 of high pressure compressor 44. Correction factor C5 is provided by multiplier 144. Multiplier 144 provides the product of input K3 and the output of subtractor 146. Subtractor 146 provides a difference between two signals: (1) the Base TPZ corresponding to the base level of fuel flow WFPZ to pressure P30 (the output of Schedule 122) and (2) the TPZ demand signal corresponding to a desired primary combustion zone temperature. Signal TPZ demand is output by schedule 148 based on the temperature signal T30 from sensor 92b.

Factors K1-K5 of control 120 are dependent on engine configuration. Also, it should be appreciated that schedules 122 and 148 can be in the form of a look-up table, one or more mathematical functions, and/or another quantitative relationship between the indicated variables. Schedule 122 provides the ratio between fuel flow and high pressure compressor discharge pressure (WFPZ/P30base) as a function of combustor entry temperature (using T30 as a representative substitute), which reflects the dependency of the weak extinction boundary of the combustion subsystem 50 on the combustor entry temperature. Also, it can account for changes in power level and changes in ambient temperature. The correction factor C5 of control 120 provides a correction for primary zone temperature as a function of combustor entry temperature (using signal T30 from sensor 92b as a representative substitute) with schedule 148. Furthermore, while a constant combustor primary zone temperature is typically demanded, schedule 148 can be configured to accommodate changes in this demand as a function of combustor inlet temperature.

The scheduling is corrected as a function of the HP shaft speed signal NH from sensor 94 and combustor inlet temperature (using signal T30 from sensor 92b). This correction can account for changes due to engine-to-engine variation, whole engine deterioration, and compressor interstage bleed. The schedule is corrected as a function of specific humidity, since high water content can reduce combustor temperature for a given fuel air ratio through correction factor C2. Control 120 also corrects for compressor interstage and exit bleed as measured (not shown) or inferred from secondary parameters.

To provide a fuel control to prevent flameout under different ambient conditions and that is relatively immune to engine variation, the primary zone fuel flow demand is provided as a 'non-dimensionalised' parameter—the ratio of fuel flow demand over HPC compressor delivery pressure: WFPZ/P30 with scheduling versus HP compressor delivery temperature (T30) and explicitly correcting for several aspects of operation via correction factors C1-C5. Accounting for all the indicated parameters, the 'non-dimensionalised' primary fuel flow required to prevent flameout is expressed:

$$WFPZ/P30\text{min}=(WFPZ/P30\text{base}+C3+C4+C5)/(C1\times C2);$$

where corrections provided by correction factors C1-C5 are: HP compressor exit flow, $C1=\Delta 1+(K4*NH/(T30)^{1/2})$; specific humidity, $C2=\Delta 2+(K5*\omega)$; HP6 bleed flow, $C3=K1*HP6$; HP3 bleed flow, $C4=K2*HP3$; and correction for primary zone temperature, $C5=K3*(TPZ\text{-function based on T30 from schedule 148})$.

For DLE and similar combustion systems with a small weak extinction boundary, the allowable reduction in fuel flow desired to prevent flameout may be insufficient to prevent excessive overspeeds during large load reductions. As shown in FIGS. 3-6, bleed control 220 addresses speed errors that may result from a rapid decrease in load. To maintain the overspeed within acceptable limits, the bleed control schedules the amount of bleed open as a function of the overspeed of the driven equipment. For the depicted embodiment, the bleeds used are at the exit of the low pressure compressor 42 (denoted signal LP1), interstage on the high pressure compressor 44 (denoted signal HP3) and at the exit of the high pressure compressor 44 (denoted signal HP6), the latter modulating. Alternatively, the control could be adapted for other bleed combinations.

To facilitate operation of the gas turbine at low power when in a DLE combustion mode, the bleed control opens the HP6 bleed as a function of corrected HP speed $(NH/(T20)^{1/2})$; where NH is determined with sensor 94 and T20 is determined with sensor 91b. In other embodiments, more, fewer, or different bleeds could be used. Once the peak overspeed is reached then the non-modulating bleeds are closed as a function of time. When in a DLE operating mode, the modulating HP6 bleed is closed at a fixed rate but only to the extent allowed by the schedule against $NH/(T20)^{1/2}$. If operating in a non-DLE diffusion mode, the HP6 bleed is closed at a faster rate, and not limited by the schedule against $NH/(T20)^{1/2}$. The above is shown graphically in FIGS. 3-6. The engine overspeed is indicated by the difference in observed power train rotational speed (signal NP) and the demanded rotational speed value for the power train, as represented by signal Npterr. The parameters used in FIGS. 3-6 are described as follows: K1=a threshold overspeed for opening 2*IP7 and 1*HP3 bleeds; K2=time following peak overspeed at which 2*IP7 and 1*HP3 bleeds are closed; K3=threshold overspeed for opening 1*HP3 bleed; K4=time following peak overspeed at which 1*HP3 bleed is closed; K5=threshold overspeed for opening 1*HP3 bleeds; K6=time following peak overspeed at which 1*HP3 bleed is closed; NHrt20=HP speed/(square root of low pressure compressor inlet temperature signal T20); DLE mode=two-state flag indicating combustion mode (True=DLE mode, False=Non-DLE mode); K7=HP6 bleed flow demand on detection of an electrical breaker open signal from sensor 98; K8=rate limit on closing HP6 bleed when in DLE mode (slow compared to K9); K9=rate limit on closing HP6 bleed when in non-DLE mode (fast compared to K8); and K10=rate limit on opening HP6 bleed (relatively fast).

Figure 3:
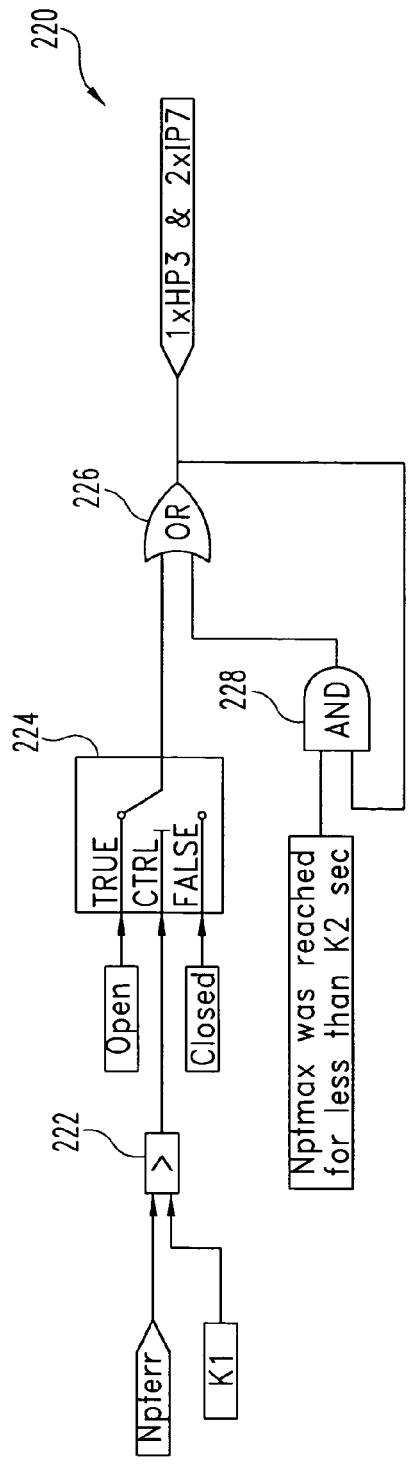
FIGS. 3-6 are diagrammatic views of a compressor bleed control for the system of FIG. 1.
Figure 4:
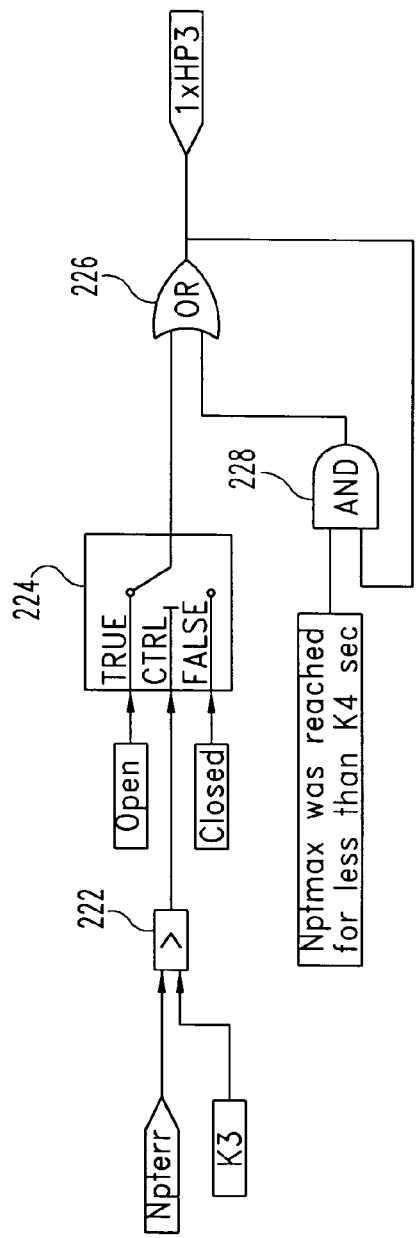
Figure 5:
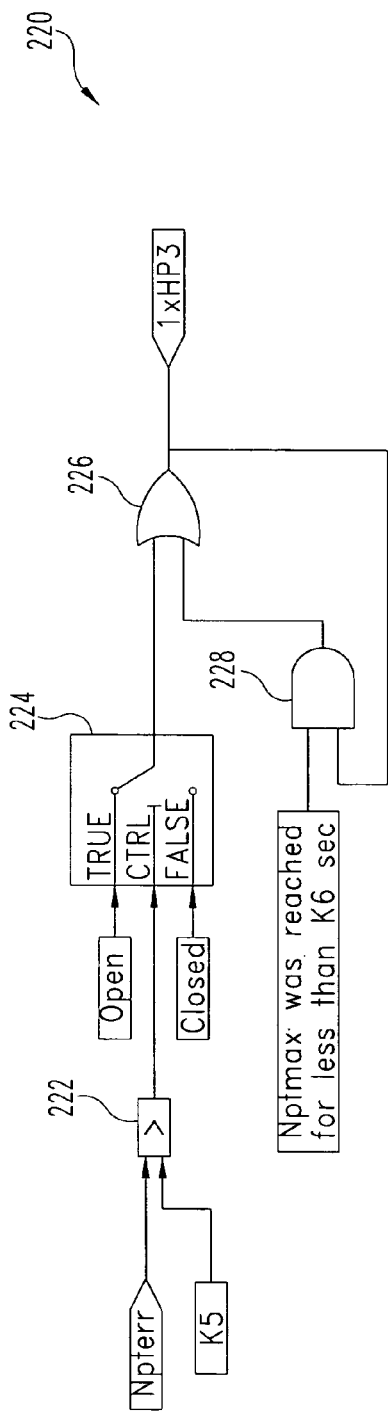

These operations are implemented in FIGS. 3-6 by various operators where like reference numerals refer to like features. These operators include two-input "greater than" comparators 222 that each have Npterr as an input and a different overspeed threshold parameter K1, K3, or K5 as the second input in FIGS. 3-5, respectively. Comparators 222 each output a control signal to set the state of a corresponding signal routing switch 224 to true if the Npterr signal is greater than the other input (K1, K3, or K5), and otherwise to false. FIGS. 3-5 also each include a two-input OR gate 226 receiving an output from the respective routing switch 224, and a two-input AND gate 228. Each AND gate 228 receives the output of the corresponding OR gate 226 as an input and the timed conditional corresponding to parameters K2, K4, and K6 in FIGS. 3-5, respectively.

Figure 6:
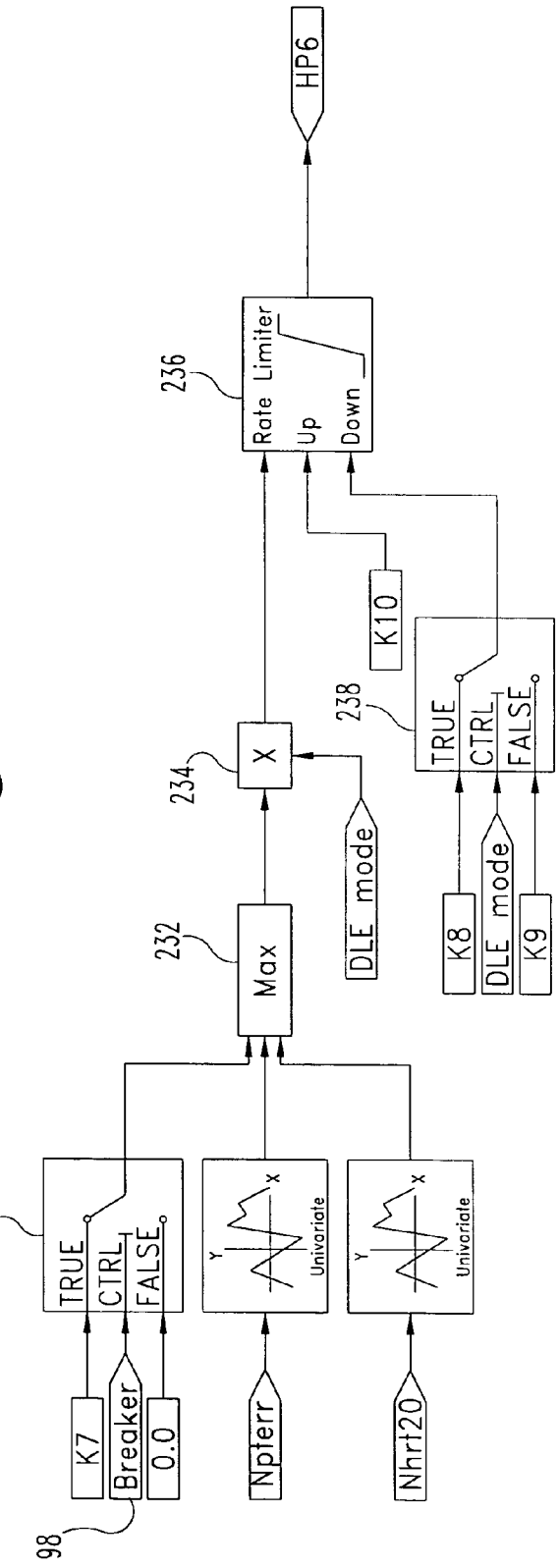

In FIG. 6, signal routing switch 230 is responsive to the breaker state from sensor 98 to select the K7 parameter if true and otherwise input zero. The output of switch 230 is input to three-input comparator 232 that outputs the maximum input value. The other two inputs of comparator 232 are processed forms of Npterr and NHrt20. The output of comparator 232 is multiplied with the DLE mode state indicator by multiplier 234. The output of multiplier 234 is input to rate limiter 236. The up rate limit for rate limiter 236 is set by input of the K10 parameter and the down rate limit is set by the output of signal routing switch 238. Signal routing switch 238 routes parameter K8 to the down rate limit input of limiter 236 if the state of DLE mode is true and routes the parameter K9 to the down rate limit input of limiter 236 if the state of DLE mode is false.

Collectively, the operating logic 220 of FIGS. 3-6 provide bleed modulation upstream of combustors 52 that is scheduled as a function of overspeed Npterr. The degree of bleed provided corresponds to the magnitude of overspeed Npterr. Accordingly, for a large reduction in electrical load, the overspeed is relatively large, causing the bleed to be fully opened. In the case of a smaller reduction in load the overspeed is less so the bleed is opened less, sufficient to limit the overspeed, but also not too large to result in an unacceptable underspeed. An additional bleed scheduling function is provided for engine operation for low and medium power levels. Under certain conditions at these levels, the primary state fuel flow necessary to prevent flameout may result in too high a minimum fuel flow to run at the desired power level without scheduling bleed open. This bleed control function opens sufficient bleed to allow partial power levels to be attained, regardless of the amount of initial overspeed.

Figure 7:
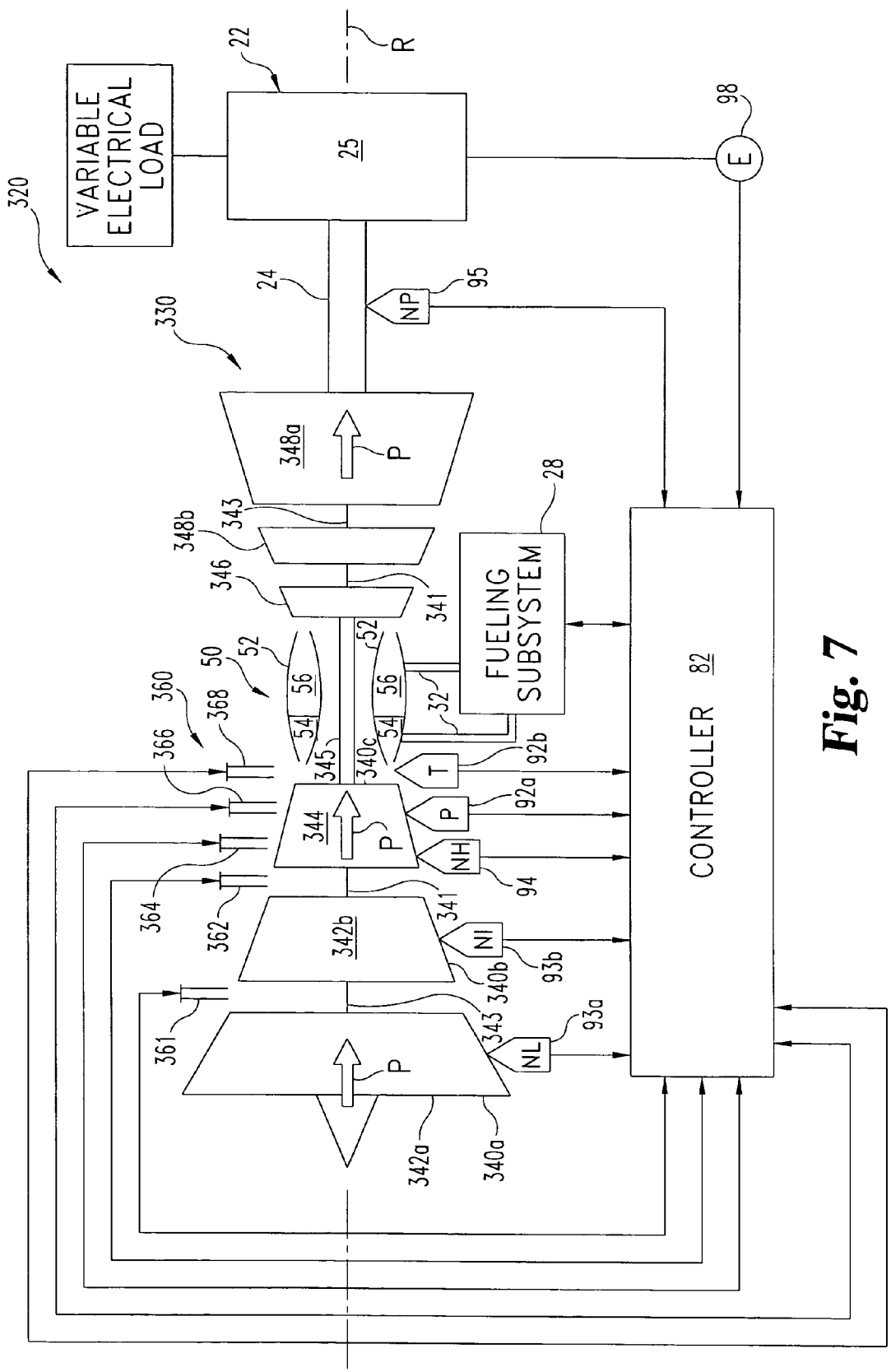
FIG. 7 is a partial, diagrammatic view of another gas turbine engine system for generating electric power.

Many other embodiments of the present invention are envisioned. For example, FIG. 7 illustrates a system 320. System 320 includes a three-spool gas turbine engine 330 that includes control system features previously described; where like reference numerals refer to like features. Also, some aspects have not been shown in as great detail to preserve clarity. The three spools of engine 330 are designed a low pressure spool 340a, an intermediate pressure spool 340b, and a high pressure spool 340c. Spool 340a includes low pressure compressor 342a coupled to turbine 348a by shaft 343. Spool 340b includes intermediate pressure compressor 342b coupled to turbine 348b by shaft 341. Spool 340c includes high pressure compressor 344 coupled to turbine 346 by shaft 345. Shafts 341, 343, and 345 are concentrically arranged so that spools 340a, 340b, and 340c can rotate independent of one another.

Instead of a free power turbine, shaft 24 is coupled to turbine 348a to drive generator 25. Spools 340a and 340b each have a corresponding rotational speed detection sensor 93a and 93b to provide speed signals NL and NI, respectively. Compressor bleed subsystem 360 includes low pressure compressor exit bleed 361, intermediate compressor exit bleed 362, two high pressure compressor interstage bleeds 364 and 366, and high pressure compressor exit bleed 368. As in the case of system 20, fuel and bleed controls can be utilized to dynamically respond to variable loading by generator 25. In other embodiments, the arrangement of the engine 30 may differ. For example, only a single spool may be used, the shaft of which also drives device 22. In another alternative, the shaft of a low pressure spool of a dual spool arrangement is also the shaft providing output power to the device 22. In still another arrangement, more than three spools are used and the shaft to drive device 22 is the same as the shaft belonging to one of the spools or is mechanically linked thereto. In still other arrangements, more or fewer spools are used in connection with a free power turbine that provides the shaft output power. Likewise, the bleed arrangement can vary with more, fewer, or differently arranged bleeds; and/or the arrangement and fueling subsystem of combustor subsystem 50 can differ. In still other embodiments, bleed may not be used to address loadsheds or fueling to prevent flameout may differ. As in the case of system 20, these variations may be used to deliver power to a load device other than generator 25.

A further example includes: driving a variable load device with a rotating shaft of a gas turbine, the gas turbine engine including a combustor with a primary stage and one or more other stages, and a first compressor providing an airflow to the combustor; varying fuel supplied to the combustor to provide a desired combustion zone temperature for the primary stage as engine loading by the variable load device changes; determining an engine overspeed in response to a decrease in the engine loading; and modulating a nonzero degree of bleed of the airflow upstream of the combustor with a bleed device in accordance with magnitude of the overspeed.

Another example includes: operating a gas turbine engine including a combustor with a primary stage and one or more other stages, and a first compressor providing an airflow to the combustor; driving a variable load device with a rotating shaft of the gas turbine engine; sensing a pressure and a temperature of the airflow upstream of the combustor; in response to a decrease in loading of the engine by the variable load device, maintaining a combustion zone temperature in the primary stage as a function of the temperature and a ratio between fuel flow provided to the primary stage and the pressure.

In still another example, a gas turbine engine includes a combustor with a primary stage and one or more other stages, and a first compressor providing an airflow to the combustor. Also included are means for driving a variable load device with a rotating shaft of the gas turbine engine; means for sensing a pressure and a temperature of the airflow upstream of the combustor; and in response to a decrease in loading of the engine by the variable load device, means for maintaining a combustion zone temperature in the primary stage as a function of the temperature and a ratio between fuel flow provided to the primary stage and the pressure.

Yet Another example includes: operating a gas turbine engine including a combustor with a primary stage and one or more other stages, and a first compressor providing an airflow to the combustor; driving a variable load device with a rotating shaft of the gas turbine engine; sensing a pressure of the airflow and an engine speed, and in response to a decrease in loading of the engine by the variable load device: selectively bleeding the airflow as a function of the engine speed; and regulating temperature in the primary stage as a function of a ratio between fuel flow provided to the primary stage and the pressure to prevent flameout.

A further example includes a gas turbine engine system with a combustor including a primary stage and one or more other stages, and a first compressor providing an airflow to the combustor. The system includes means for driving a variable load device with a rotating shaft of the gas turbine engine and means for sensing a pressure of the airflow and an engine speed, and in response to a decrease in loading of the engine by the variable load device: means for selectively bleeding the airflow as a function of the engine speed and means for regulating temperature in the primary stage as a function of a ratio between fuel flow provided to the primary stage and the pressure to prevent flameout.

Still another embodiment comprises: driving a variable load device with a rotating shaft of a gas turbine, the gas turbine engine including a combustor with a primary stage and one or more other stages; providing a pressurized air flow to the combustor during operation of the gas turbine engine; in response to a decrease in loading of the engine by the variable load device, supplying minimal fueling to the engine without flameout; and during the minimal fueling of the engine, reducing power output of the engine by providing a nonzero degree of bleed of the pressurized air flow with a bleed device.

In a different example, a gas turbine engine includes a combustor with a primary stage and one or more other stages, and a rotatable shaft to provide power to a variable load device. Also included are means for providing a pressurized air flow to the combustor during operation of the gas turbine engine; means for supplying minimal fueling to the engine without flameout that is responsive to a decrease in loading of the engine; and means for reducing power output of the engine by providing a nonzero degree of bleed of the pressurized air flow with a bleed device during the minimal fueling of the engine.

Yet another example comprises a gas turbine engine including a combustor with a primary stage and one or more other stages, a first compressor operable to provide airflow to the combustor, a bleed device operable to selectively bleed the airflow upstream of the combustor, a fueling subsystem, and a rotatable shaft operable to provide mechanical power. A variable load device is operable to be mechanically powered by the shaft. A first sensor is operable to provide a speed signal corresponding to rotational speed of the gas turbine engine. A second sensor is operable to provide a pressure signal corresponding to pressure of the airflow upstream of the combustor. A controller is operatively coupled to the bleed device, the fueling subsystem, the first sensor, and the second sensor. The controller is responsive to the speed signal to determine overspeed of the gas turbine engine resulting from a decrease in loading of the gas turbine engine by the variable load device and to generate one or more bleed control signals, and the controller is responsive to the pressure signal to provide one or more fuel control signals to maintain a desired combustion zone temperature in the primary stage of the combustor. The one or more fuel control signals are determined by the controller as a function of a ratio between the pressure signal and a fuel flow value. The bleed device is responsive to the one or more bleed control signals to selectively bleed the airflow and the fueling subsystem is responsive to the one or more fuel control signal to selectively adjust fueling to the primary stage of the combustor to maintain the desired combustion zone temperature.

A further example includes: a variable load device; a gas turbine engine including a combustor with a primary stage and one or more other stages, a compressor operable to provide airflow to the combustor, a bleed device operable to selectively bleed the airflow upstream of the combustor, a fueling subsystem, and a rotatable shaft operable to provide mechanical power to the variable load device; means for varying fuel supplied to the combustor to provide a desired temperature of a combustion zone in the primary stage as engine loading by the variable load device changes; means for determining an engine overspeed in response to a decrease in the engine loading; and means for modulating a nonzero degree of bleed of the air flow upstream of the combustor with a bleed device in accordance with magnitude of the overspeed.

Any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   driving a variable load device with a rotating shaft of a gas turbine, the gas turbine engine including a combustor with a primary stage and one or more other stages, and a first compressor providing an airflow to the combustor;
   varying fuel supplied to the combustor to provide a desired combustion zone temperature for the primary stage as engine loading by the variable load device changes;
   determining an engine overspeed in response to a decrease in the engine loading; and
   modulating a nonzero degree of bleed of the airflow upstream of the combustor with a bleed device in accordance with magnitude of the overspeed.

2. The method of claim 1, which includes:
   sensing pressure and temperature of the airflow upstream of the combustor;
   operating the combustor in a dry low emissions mode; and
   wherein the varying of the fuel supplied to the combustor includes adjusting the fuel as a function of the temperature of the airflow upstream of the combustor and a ratio between fuel flow to the primary stage of the combustor and the pressure of the airflow upstream of the combustor.

3. The method of claim 2, wherein the pressure is a discharge pressure of the compressor and the temperature is a combustor inlet temperature, and which includes scheduling the ratio as a function of the temperature.

4. The method of claim 3, wherein the modulating of the nonzero degree of bleed is performed at one or more stages of the compressor, the gas turbine engine includes another compressor upstream of the compressor, and which includes correcting the scheduling for humidity, engine deterioration, interstage compressor bleed, and compressor exit bleed.

5. The method of claim 1, wherein the bleed device includes a number of bleed valves each corresponding to a different stage of the compressor.

6. The method of claim 1, wherein the varying of the fuel includes determining fuel flow from a relationship between the desired combustion zone temperature and a ratio between the fuel flow and pressure of the airflow upstream of the compressor.

7. The method of claim 1, which includes
   in response to the decrease in the engine loading, supplying minimal fueling to the engine without flameout; and
   during the minimal fueling of the engine, reducing power output of the engine by providing a nonzero amount of bleed of the pressurized airflow with the bleed device.

8. The method of claim 1, wherein the variable load device includes an electrical power generator coupled to the shaft, the generator having a variable electrical load.

9. A method, comprising:
   operating a gas turbine engine including a combustor with a primary stage and one or more other stages, and a first compressor providing an airflow to the combustor;
   driving a variable load device with a rotating shaft of the gas turbine engine;
   sensing a pressure and a temperature of the airflow upstream of the combustor;
   in response to a decrease in loading of the engine by the variable load device, maintaining a combustion zone temperature in the primary stage as a function of the temperature and a ratio between fuel flow provided to the primary stage and the pressure.

10. The method of claim 9, which includes determining humidity, and rotational speed of the compressor and wherein the function further depends on the humidity and the rotational speed of the compressor.

11. The method of claim 9, wherein the gas turbine engine includes another compressor upstream of the compressor, and which includes correcting for interstage compressor bleed, and compressor exit bleed.

12. The method of claim 9, wherein the gas turbine engine includes a compressor bleed device, and the method further comprising scheduling a nonzero amount of the compressor bleed that varies with magnitude of an engine overspeed resulting form the decrease in loading.

13. The method of claim 9, which includes:
   in response to the decrease in loading, supplying minimal fueling to the engine without flameout; and during the minimal fueling of the engine, reducing power output of the engine by providing a nonzero amount of bleed of the pressurized airflow with a bleed device.

14. The method of claim 9, wherein the variable load device includes an electrical power generator coupled to the shaft, the generator having a variable electrical load, and further comprising operating the combustor in a dry low emissions mode.

15. A method, comprising:
operating a gas turbine engine including a combustor with a primary stage and one or more other stages, and a first compressor providing an airflow to the combustor;
driving a variable load device with a rotating shaft of the gas turbine engine;
sensing a pressure of the airflow and an engine speed, and in response to a decrease in loading of the engine by the variable load device:
selectively bleeding the airflow as a function of the engine speed; and
regulating temperature in the primary stage as a function of a ratio between fuel flow provided to the primary stage and the pressure to prevent flameout.

16. The method of claim 15, which includes:
determining an engine overspeed based on the engine speed;
scheduling an amount of the bleeding based on magnitude of the overspeed; and
scheduling the fuel flow from the ratio to provide a desired combustion zone temperature in the primary stage.

17. The method of claim 15, which includes:
providing the engine with a second compressor upstream of the first compressor; and
correcting the function of the ratio for humidity, engine deterioration, and interstage compressor bleed.

18. The method of claim 15, which includes:
in response to the decrease in loading, supplying minimal fueling to the engine without flameout; and
during the minimal fueling of the engine, reducing power output of the engine by providing a nonzero amount of bleed of the airflow with the bleed device.

19. The method of claim 15, wherein the variable load device includes an electrical power generator coupled to the shaft, the generator having a variable electrical load.

20. The method of claim 15, which includes operating the combustor in a dry low emission mode.

21. A method, comprising:
driving a variable load device with a rotating shaft of a gas turbine, the gas turbine engine including a combustor with a primary stage and one or more other stages;
providing a pressurized air flow to the combustor during operation of the gas turbine engine;
in response to a decrease in loading of the engine by the variable load device, supplying minimal fueling to the engine without flameout; and
during the minimal fueling of the engine, reducing power output of the engine by providing a nonzero degree of bleed of the pressurized air flow with a bleed device.

22. The method of claim 21, which includes regulating temperature in the primary stage as a function of a ratio between fuel flow provided to the primary stage and the pressure to prevent flameout.

23. The method of claim 21, which includes responding to engine overspeed by providing an amount of compressor bleed corresponding to magnitude of the engine overspeed.

24. The method of claim 21, wherein the variable load device includes an electrical power generator coupled to the shaft, the generator having a variable electrical load.

25. Apparatus, comprising:
a gas turbine engine including a combustor with a primary stage and one or more other stages, a first compressor operable to provide airflow to the combustor, a bleed device operable to selectively bleed the airflow upstream of the combustor, a fueling subsystem, and a rotatable shaft operable to provide mechanical power;
a variable load device operable to be mechanically powered by the shaft;
a first sensor operable to provide a speed signal corresponding to rotational speed of the gas turbine engine;
a second sensor operable to provide a pressure signal corresponding to pressure of the airflow upstream of the combustor;
a controller operatively coupled to the bleed device, the fueling subsystem, the first sensor, and the second sensor, the controller being responsive to the speed signal to determine overspeed of the gas turbine engine resulting from a decrease in loading of the gas turbine engine by the variable load device and generate one or more bleed control signals, and the controller being responsive to the pressure signal to provide one or more fuel control signals to maintain a desired combustion zone temperature in the primary stage of the combustor, the one or more fuel control signals being determined by the controller as a function of a ratio between the pressure signal and a fuel flow value; and
wherein the bleed device is responsive to the one or more bleed control signals to selectively bleed the airflow and the fueling subsystem is responsive to the one or more fuel control signal to selectively adjust fueling to the primary stage of the combustor to maintain the desired combustion zone temperature.

26. The apparatus of claim 25, wherein variable load device includes an electric power generator with a variable electrical load.

27. The apparatus of claim 25, wherein the variable electrical load include an electric power grid and local equipment coupled to the electric power generator.

28. The apparatus of claim 25, further comprising a third sensor operable to provide a temperature signal corresponding to temperature of the airflow upstream of the combustor, the controller including means for scheduling the ratio as a function of the temperature signal.

29. The apparatus of claim 28, wherein the first compressor includes several stages and the bleed device includes a bleed valve corresponding to one of the stages.

30. The apparatus of claim 29, wherein the bleed device includes another bleed valve corresponding to another of the stages.

31. The apparatus of claim 30, wherein the gas turbine engine includes a second compressor upstream of the first compressor.

32. The apparatus of claim 31, wherein the temperature signal is representative of combustor inlet temperature and the controller includes means for correcting the scheduling means as a function of humidity, rotational speed of the first compressor, the combustor inlet temperature, and interstage compressor bleed.

33. The apparatus of claim 25, wherein the controller includes means for supplying minimal fueling to the engine without flameout in response to the decrease in loading and means for reducing power output of the engine by providing a nonzero degree of bleed of the pressurized air flow with a bleed device.

34. Apparatus, comprising:
- a variable load device;
- a gas turbine engine including a combustor with a primary stage and one or more other stages, a compressor operable to provide airflow to the combustor, a bleed device operable to selectively bleed the airflow upstream of the combustor, a fueling subsystem, and a rotatable shaft operable to provide mechanical power to the variable load device;
- means for varying fuel supplied to the combustor to provide a desired temperature of a combustion zone in the primary stage as engine loading by the variable load device changes;
- means for determining an engine overspeed in response to a decrease in the engine loading; and
- means for modulating a nonzero degree of bleed of the air flow upstream of the combustor with a bleed device in accordance with magnitude of the overspeed.

* * * * *